Figure 1:
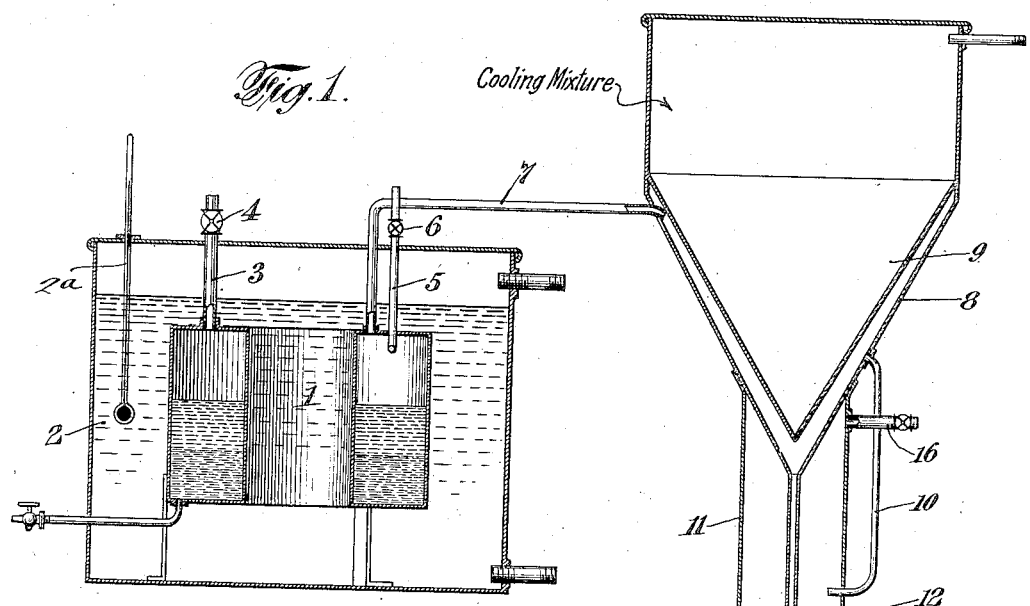

Sept. 2, 1924.

J. H. COTTON 1,507,337

PURIFICATION OF ETHER AND OF OTHER VOLATILE SUBSTANCES

Filed Sept. 25, 1918

Inventor
James H. Cotton
By his Attorneys
Prindle, Wright & Small.

Patented Sept. 2, 1924.

1,507,337

UNITED STATES PATENT OFFICE.

JAMES HENRY COTTON, OF TORONTO, ONTARIO, CANADA, ASSIGNOR TO E. I. DU PONT DE NEMOURS & COMPANY, OF WILMINGTON, DELAWARE, A CORPORATION OF DELAWARE.

PURIFICATION OF ETHER AND OF OTHER VOLATILE SUBSTANCES.

Application filed September 25, 1918. Serial No. 255,637.

*To all whom it may concern:*

Be it known that I, JAMES H. COTTON, of Toronto, in the Province of Ontario, Canada, have invented a certain new and useful Improvement in Purification of Ether and of Other Volatile Substances, and do hereby declare that the following is a full, clear, and exact description thereof.

My invention relates to a process for purifying volatile substances, such as ethyl ether, and pertains especially to a process of this kind in which volatile impurities that may be present are separated by fractional condensation.

The commercial process for the manufacture of diethyl oxide, commonly known as ethyl ether, sulphuric ether, or ether, consists in heating a mixture of ethyl alcohol and concentrated sulphuric acid. The reaction by which ether is formed in this process has been the subject of considerable scientific investigation, and probably proceeds in two stages, but for all practical purposes it consists in the abstraction from two molecules of alcohol of one molecule of water as represented by the following equation:

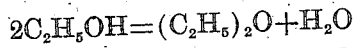

$$2C_2H_5OH = (C_2H_5)_2O + H_2O$$

The mixture of sulphuric acid and alcohol used is, however, capable of forming many other products, and the formation of products other than diethyl oxide is further promoted by such conditions as contact of the ingredients of the mixture with the hot metal of which the apparatus is constructed, the presence in the apparatus of small quantities of air, secondary reactions, impurities in the alcohol and in the sulphuric acid, etc. For these reasons the ether produced is quite impure. If the ether is to be used in the arts as a solvent or for some other ordinary purposes, simple washing with alkali or water, followed by distillation, is usually considered sufficient. If the ether is to be used for medicinal purposes, however, such as administration for the purpose of producing anæsthesia, it is essential that the crude ether be carefully purified. Among the impurities which it may be desirable to remove may be mentioned aldehydes, acetone, acids, dissolved gases, peroxides, ethyl alcohol, carbon monoxide, sulphur dioxide, fusel oil, vinyl alcohol, higher homologous ethers, etc. Some of these impurities may in themselves be very undesirable in ether which is to be used as an anæsthetic, while others may be of such a nature as to cause gradual deterioration of the ether after it has been sealed up in a container. Because of the varied chemical nature of the impurities and the wide range of boiling points which they represent, the complete purification of the ether by a simple process has always been a difficult matter.

The object of my invention is to provide a convenient process through the use of which ethyl ether and other volatile substances may be easily freed from all but the merest traces of any impurity.

Another object of my invention is to dispense, as far as possible, with the use of chemical reagents, so as to thereby reduce the expense of the process to a minimum.

Broadly stated, the new process consists essentially in evaporating the volatile substance to be purified, preferably under atmospheric pressure and below the normal boiling point of said substance, and fractionally condensing the resulting vapor to effect the separation of impurities which have accompanied the vapor of the volatile substance.

The apparatus constituting part of my invention comprises in general an evaporating vessel and a series of condensers connected therewith, each of which is adapted to be maintained at a different temperature from the others.

The product obtained by the use of my apparatus in accordance with the method of using it outlined in the following description is so pure that it will be found to give negative tests for impurities by all commonly known methods of analysis. It may be stated that the best results will be obtained and the application of the process simplified if the ether is first subjected to a simple purification process in accordance with some one or more of the well-known methods for the removal of the greater portion of the impurities.

While the process may be carried out in various forms of apparatus, one form of apparatus which I have found to be suitable is exemplified in the following description and illustrated in the accompanying drawings, in which—

Figure 2:
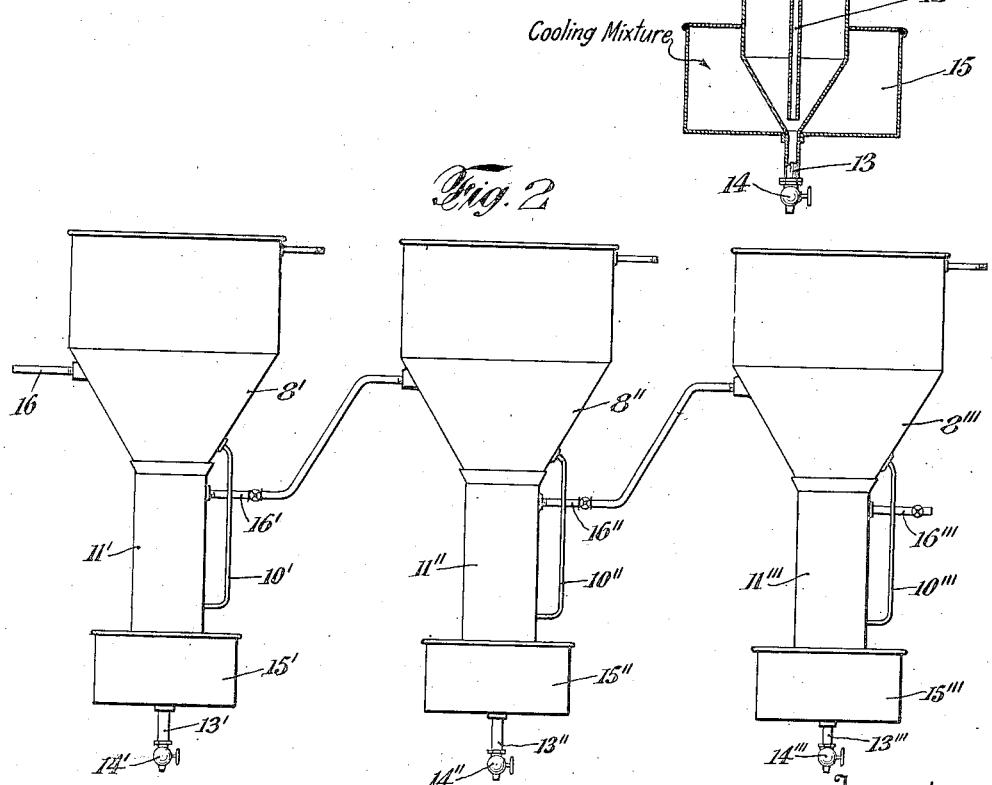

Figure 1 is a vertical longitudinal section through part of the apparatus, including the evaporator and the first of the series of condensers; and Figure 2 is a side elevation, on a reduced scale, of three condensers of the series, the first condenser of which is shown in Figure 1.

An annular evaporator 1 is disposed in a container 2 adapted to hold water or through which water may be circulated. The evaporator 1 is supplied with liquid through a pipe 3, having a valve 4. Another inlet pipe 5 with a valve 6, is provided for introducing a current of an inert gas, such as air. From the top of the evaporator there leads a pipe 7 to a condenser 8; which is shaped like a funnel, and in which is nested an inverted conical member 9. The conical member 9 is so spaced from the conical part 8 as to form a condensing chamber. The inner conical member 9 is adapted to hold a cooling mixture. The stem 12 of the funnel-shaped member is surrounded by a jacket 11, which also acts as a condenser. An outlet 13, with a valve 14, is provided in the lower part of the jacket 11, and the lower portion of this jacket is surrounded by a vessel 15 adapted to hold a refrigerating mixture.

A pipe 16 leads from the upper part of the jacket 11 to the upper part of a second condenser 8', which is similar in all respects to the condenser 8 just described. An outlet pipe 16' leads from the condenser 8' to a third condenser 8", and a third outlet pipe 16" leads from the third condenser 8" to a fourth condenser 8''', all of the condensers being similar in construction.

In applying the process to the purification of ethyl ether, in which connection it has been found to be especially advantageous, the crude or partially purified ether is mixed with about 10 to 20% of its volume of pure water and maintained at a temperature at which active evaporation of the ether will occur, but below the boiling point of the ether. A current of a gas, such as air, which is inert with respect to the ether, is passed over the surface of the liquid to carry off the vapors which have formed. The vapor mixture is then cooled in several stages, the cooling temperature of each succeeding stage being lower than that of the immediately preceding stage. When purifying ethyl ether, the temperature of the first cooling stage is preferably about 20° C., and the temperature of the last cooling stage is preferably between —15 and —20° C., intermediate temperatures being employed at the respective intermediate stages. The purest ether will be obtained at the middle stage or stages, the impurities of higher and lower boiling points than ether being condensed mainly in the first and last stages, respectively. Any ether which may not have been condensed at the last cooling stage may be recovered by passing the effluent from the last stage into ether-absorbing material.

The process is carried out in the above-described apparatus as follows:

The evaporator 1 is partly filled through the inlet pipe 3 with crude ether mixed with 10 to 20% of its volume of distilled water. The container 2 is filled with water which is maintained at a temperature of about 25° C., since at this temperature ether has a considerable vapor pressure. The vapors of ether which are formed are carried out through the pipe 7 to the condenser 8 by a current of air introduced through the pipe 5. As the air-vapor mixture passes down through the condensing chamber formed by the oppositely-disposed conical members 8 and 9, some of the high boiling impurities are condensed and pass downward through the stem 12 into the cooling chamber 11. That part of the air-vapor mixture which remains uncondensed passes out through the pipe 10 into an intermediate portion in the chamber 11, where it is subjected to a further condensing action caused by a cooling mixture in the vessel 15 which surrounds the lower part of the chamber 11. This chamber 11 serves to accumulate any droplets of ether which may have been carried along mechanically from the main condensing chamber. The principal object of the refrigerating chamber 15 is to prevent evaporation of condensed liquid which accumulates in the bottom of the chamber 11. At suitable intervals the condensed liquid which has accumulated in the bottom of the chamber 11 is drawn off into a suitable container (not shown) through the pipe 13 by opening valve 14.

The uncondensed air-vapor mixture passes up through chamber 11 and through pipe 16 to the second condenser 8', where it is subjected to a lower temperature than prevailed in the condenser 8. The vapor which remains uncondensed in 8' passes through pipe 10' into the supplemental cooling chamber 11' and out at 16' into the third condenser 8", where the vapor is subjected to a still lower temperature, and, if desirable, to one or more other condensers.

Where three condensers are used, the cooling mixture which is placed in the inverted conical member 9 of each of the condensers has a temperature of about 20° C. in the first condenser, whereas the cooling mixture in the second condenser has a temperature of about 7° C., and the cooling mixture in the third condenser a temperature of from about −15 to −20° C. The liquid condensed in the first condenser 8 will then be found to contain a large proportion of alcohol, water and other comparatively high boiling compounds, together with some dissolved impurities and some ether. The condenser 8″ will contain a fairly pure ether, but it will be contaminated with substances whose boiling point is below that of pure ether. The purest ether will be found in condenser 8′.

When more than three condensers are used, such as the four condensers as shown in the accompanying drawings, the temperatures of the first and last condensers should be about the same as those above given for the first and third condensers,—that is, about 20° C. for the first and about −15 to −20° C. for the last; the temperatures of the intermediate condensers will approach each other more closely than those given above, and the purest ether will be found in the condensers which are in the center of the series.

Instead of increasing the number of condensers, three condensers only may be used and the ether which condenses in the middle one, 8′, may be put through the process a second or a third time.

It will be understood that various modifications may be made in the apparatus above described without departing from my invention, and that various changes may be made in the process, depending upon the particular volatile substance which is to be purified and the degree of purity of the substance before being subjected to this new process. For example, some other gas may be used instead of air, so long as the gas selected has no action on the ether under the conditions described; the temperatures at which the condensers are maintained may be varied within certain limits and will depend, of course, in each case upon the particular volatile substance which is being purified.

I claim:

1. The process of purifying a volatile substance containing volatile impurities, which comprises evaporating the impure substance at a temperature below its boiling point, subjecting the resulting vapors to cooling in a series of well-defined stages, the cooling temperature employed at each succeeding stage being lower than the temperature of the immediately preceding stage, and separating said substance in a substantially pure state at an intermediate cooling stage.

2. The process of purifying ethyl ether containing volatile impurities, which comprises evaporating the ether at a temperature below its boiling point, subjecting the resulting vapors to cooling in a series of well-defined stages, the cooling temperature employed at each succeeding stage being lower than the temperature of the immediately preceding stage, and separating ether in a substantially pure state at an intermediate cooling stage.

3. The process of purifying ethyl ether containing volatile impurities, which comprises mixing the impure ether with water, maintaining the mixture at a temperature below the boiling point of the ether but sufficiently high to cause active evaporation, subjecting vapors of said impure ether to cooling in a series of well-defined stages, the cooling temperature employed at a succeeding stage being lower than the temperature of a preceding stage, said temperatures being sufficiently low to condense at least some of the impurities.

4. The process of purifying ethyl ether containing volatile impurities, which comprises mixing the impure ether with water, maintaining the mixture at a temperature below the boiling point of the ether but sufficiently high to cause active evaporation, carrying away the vapors by a current of an inert gas, and subjecting the resulting vapor mixture to frictional condensation.

5. The process of purifying ethyl ether containing volatile impurities, which comprises adding water thereto, passing a current of air in contact with the liquid to evaporate the ether, and subjecting the air-vapor mixture to cooling in a series of well-defined stages to cause fractional condensation, the temperature of the first stage being about 20° C. and that of the last stage from about −15 to −20° C.

6. The process of purifying ethyl ether containing volatile impurities, which comprises adding water thereto, passing a current of air in contact with the liquid, while maintaining the latter at a temperature below the boiling point of the ether, to evaporate the ether, and subjecting the air-vapor mixture to cooling in a series of well-defined stages to cause fractional condensation, the temperature of the first stage being about 20° C. and that of the last stage from about −15 to −20° C.

7. The process of purifying ethyl ether containing volatile impurities, which comprises passing a current of air in contact with impure ether containing from about 10 to 20% of its volume of water and maintained at a temperature of about 25° C., and subjecting the resulting current of air and ether vapor to cooling in a series of stages, the cooling temperature employed at a succeeding stage being lower than the temperature of a preceding stage, said temperatures being sufficiently low to condense at least some of the impurities.

8. The process of purifying ethyl ether containing volatile impurities, which comprises passing a current of air in contact with impure ether containing from about 10 to 20% of its volume of water and maintained at a temperature of about 25° C., and subjecting the resulting current of air and ether vapor to cooling in a series of stages, the degree of cooling being sufficient to cause condensation of substantially pure ether only at one stage and condensation of impurities at other stages.

In testimony that I claim the foregoing I have hereunto set my hand.

JAMES HENRY COTTON.

Witnesses:
P. E. STRICKLAND,
F. H. McCORMICK.